United States Patent
Li (10) Patent No.: US 10,714,089 B2
(45) Date of Patent: Jul. 14, 2020

(54) SPEECH RECOGNITION METHOD AND DEVICE BASED ON A SIMILARITY OF A WORD AND N OTHER SIMILAR WORDS AND SIMILARITY OF THE WORD AND OTHER WORDS IN ITS SENTENCE

(71) Applicant: BOE Technology Group Co., Ltd., Beijing (CN)

(72) Inventor: Yingjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 215 days.

(21) Appl. No.: 15/909,213

(22) Filed: Mar. 1, 2018

(65) Prior Publication Data
US 2019/0043504 A1 Feb. 7, 2019

(30) Foreign Application Priority Data
Aug. 3, 2017 (CN) .......................... 2017 1 0655476

(51) Int. Cl.
| | |
|---|---|
| G01C 21/36 | (2006.01) |
| G10L 19/00 | (2013.01) |
| G06F 8/70 | (2018.01) |
| G10L 15/26 | (2006.01) |
| G10L 15/05 | (2013.01) |

(Continued)

(52) U.S. Cl.
CPC .............. *G10L 15/26* (2013.01); *G06F 40/10* (2020.01); *G06F 40/216* (2020.01); *G06F 40/253* (2020.01); *G06F 40/284* (2020.01); *G10L 15/05* (2013.01); *G10L 15/183* (2013.01); *G01C 21/3608* (2013.01); *G10L 15/063* (2013.01); *G10L 19/0018* (2013.01); *G10L 2015/088* (2013.01)

(58) Field of Classification Search
CPC ............. G01C 21/3608; G10L 19/0018; G06F 17/3053; G06F 8/78; G06F 17/30; G06F 17/2827
USPC ............................................... 704/7; 701/418
See application file for complete search history.

(56) References Cited

U.S. PATENT DOCUMENTS

| | | | | |
|---|---|---|---|---|
| 5,978,809 A | * | 11/1999 | Berner | .................... G06F 8/78 |
| 8,521,539 B1 | * | 8/2013 | Teng | .................. G01C 21/3608 |
| | | | | 701/418 |

(Continued)

*Primary Examiner* — Farzad Kazeminezhad
(74) *Attorney, Agent, or Firm* — Arent Fox LLP; Michael Fainberg (57) ABSTRACT

The disclosure discloses a speech recognition method and a device, aiming at recognizing words in a sentence text after determining the sentence text corresponding to an input speech, and substituting after determining the wrong words which do not conform to an application scenario in the sentence text, so as to improve the accuracy of speech recognition. The speech recognition method according to embodiments of the present disclosure includes: recognizing a sentence text corresponding to an input speech according to the speech; recognizing wrong words in the sentence text; determining substitute words corresponding to the wrong words; and substituting the wrong words with the substitute words. The determination of the wrong words is based on comparing an average similarity of the word with N other similar words against a first threshold and comparing a maximum similarity between the said word and other words in the sentence against a second threshold.

16 Claims, 5 Drawing Sheets

(51) Int. Cl.

| | | |
|---|---|---|
| *G10L 15/183* | (2013.01) | |
| *G06F 40/10* | (2020.01) | |
| *G06F 40/216* | (2020.01) | |
| *G06F 40/253* | (2020.01) | |
| *G06F 40/284* | (2020.01) | |
| G10L 15/08 | (2006.01) | |
| G10L 15/06 | (2013.01) | |

(56) References Cited

U.S. PATENT DOCUMENTS

2010/0131261 A1* 5/2010 Lin ................... G06F 17/2827
704/7
2018/0349380 A1* 12/2018 Chen ................... G10L 19/0018

* cited by examiner

SPEECH RECOGNITION METHOD AND DEVICE BASED ON A SIMILARITY OF A WORD AND N OTHER SIMILAR WORDS AND SIMILARITY OF THE WORD AND OTHER WORDS IN ITS SENTENCE

CROSS-REFERENCE TO RELATED APPLICATIONS

This application claims the priority to Chinese Patent Application No. 201710655476.2, filed on Aug. 3, 2017, the content of which is hereby incorporated by reference in its entirety.

FIELD

The present disclosure relates to the technical field of speech recognition, and in particular to a speech recognition method and device.

BACKGROUND

Along with the rapid increase of network intelligent devices in quantities, the forms of devices also become diversified, and the interactive modes also differ from one another. Particularly, along with the sharp rise of enterprises engaged in speech recognition technology, the speech recognition technology has become more and more mature, and the application range has become wider and wider. For some enterprises which develop products with a function of speech recognition, in most cases, they integrate a software development kit (SDK) of speech recognition companies to realize the function of speech recognition, and they use a general SDK rather than recognizing according to specific application scenarios, then the following condition easily occurs: the recognized results are consistent with the input pronunciation, meanwhile, the recognized results are reasonable semantically, but do not conform to the actual application scenario.

For example, under an application scenario of arts, the results obtained through speech recognition is "what are you talking about", while the meaning to be actually expressed is "what picture is this". Therefore, although the recognized result is consistent with the input pronunciation, the recognized result does not conform to the actual application scenario.

Therefore, the speech recognition results are deviated, and in view of this, it is quite necessary to correct wrong words for the results of speech recognition.

SUMMARY

The embodiment of the present disclosure provides a speech recognition method, the method including: recognizing a sentence text corresponding to an input speech according to the speech; recognizing wrong words in the sentence text; determining substitute words corresponding to the wrong words; and substituting the wrong words with the substitute words.

Correspondingly, the embodiment of the present disclosure further provides a speech recognition device, the device including: a processor; and a memory storing at least one instruction, wherein the processor is configured to execute the at least one instruction to: recognize a sentence text corresponding to an input speech according to the speech; recognize the wrong words in the sentence text; determine substitute words corresponding to the wrong words; and substitute the wrong words with the substitute words.

DETAILED DESCRIPTION OF THE EMBODIMENTS

It should be noted that, specific details are described in the following description for fully understanding of the present disclosure. However, the present disclosure can be implemented in many other ways different from those described herein, and those skilled in the art can make similar generalizations under the premise of not departing from the connotations of the present disclosure. Therefore, the present disclosure is not limited by the specific embodiments disclosed below, for example, some words are used in the specification and the claims to refer to certain components. Those skilled in the art should understand that, hardware manufacturers may use different nouns to call the same component. In the present specification and claims, the difference between names is not used as a way to differentiate components, while the difference of components in functions is used as a standard for differentiation, for example, the word "comprising" mentioned in the whole specification and the claims is an open word, so it should be explained as "including but not limited to". The follow-up description in the specification is preferable implementations for implementing the present application; however, the description is for the purpose of describing general principles of the present application, rather than limiting the scope of the present application. The protection scope of the present application should be subjected to the scope defined in the appended claims.

The embodiments of the present disclosure provide a speech recognition method and device, aiming at recognizing words in a sentence text after determining the sentence text corresponding to an input speech, and substituting after determining the wrong words which do not conform to the application scenario in the sentence text, so as to improve the accuracy of speech recognition.

It should be noted that, the speech recognition method according to an embodiment of the present disclosure mainly aims at the recognition of speech under specific language environment. The preset training corpus in the embodiment of the present disclosure contains a plurality of words trained under specific language environment, where one word can be composed of one Chinese character or a plurality of Chinese characters. Therefore, there may be a plurality of preset training corpus in the embodiment of the present disclosure, and different language application scenarios correspond to different preset training corpora. In the embodiment of the present disclosure, the preset pinyin-to-word mapping tables are in one-to-one correspondence with the preset training corpora.

Figure 1:
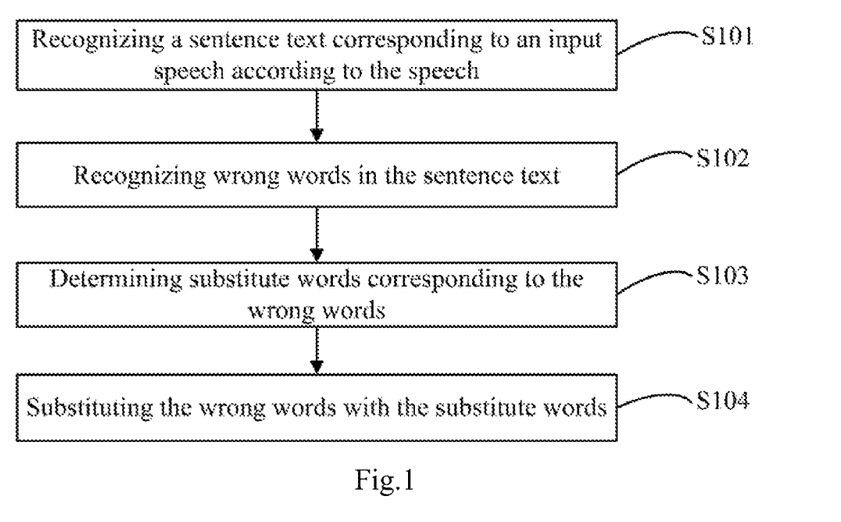
FIG. 1 is a flow diagram of a speech recognition method according to an embodiment of the present disclosure.

Please refer to FIG. 1, a speech recognition method according to an embodiment of the present disclosure includes the following steps.

S101: recognizing a sentence text corresponding to an input speech according to the speech.

Generally, the sentence text corresponding to the input speech can be recognized according to a cloud server or local recognition function provided by a third-party speech recognition company. Specifically, a speech can be recognized according to general software to obtain a sentence text, and this is not specifically limited herein.

S102: recognizing wrong words in the sentence text.

Where each word in the sentence text is recognized to determine wrong words which do not conform to the language environment. The wrong words or substitute words in the embodiment of the present disclosure can be a Chinese character or a word composed of a plurality of Chinese characters.

S103: determining substitute words corresponding to the wrong words.

S104: substituting the wrong words with the substitute words.

It should be noted that, the sentence text corresponding to a speech may include one word or a plurality of words. When the sentence text includes a plurality of words, when recognizing the wrong words in the sentence text, each word in the sentence text is recognized in sequence; a substitute word corresponding to each wrong word is determined, and each wrong word in the sentence text is substituted. Where when the sentence text includes a plurality of words, the next word in the sentence text can be recognized after the first wrong word is recognized and substituted, until each word in the sentence text is recognized.

In the speech recognition method according to embodiments of the present disclosure, firstly a sentence text corresponding to an input speech is recognized according to the speech; then the wrong words in the sentence text are recognized; the substitute words corresponding to the wrong words are determined; and the wrong words are substituted with the substitute words. Therefore, in the speech recognition method according to an embodiment of the present disclosure, after the sentence text corresponding to an input speech is determined, the words in the sentence text are recognized to determine the wrong word not conforming to the application scenario in the sentence text, then the substitute word corresponding to the wrong word is determined and the wrong word is substituted, therefore, the accuracy of speech recognition is improved.

In order to further recognize each word and substitute each wrong word in the sentence text according to the language environment of speech, firstly, an introduction will be given on the preset training corpus and the preset pinyin-to-word mapping table in the embodiment of the present disclosure.

In the embodiment of the present disclosure, the preset training corpus is set for different language environments. For example, for the artistic environment, a plurality of words related to the artistic environment are set, and the language library composed of such a plurality of words is called a training corpus. Therefore, for different speech application scenarios, the corresponding preset training corpora are different. In the embodiment of the present disclosure, the preset training corpus includes a plurality of words in the same speech application scenario, and each word corresponds to one word vector model. Where each word in the preset training corpus is subjected to distributed representation to obtain the word vector model of each word, where the training can be realized by using tools such as Word2vec, and the tools are not specifically limited herein.

In the embodiment of the present disclosure, the recognition of wrong words in a sentence text includes: according to a preset training corpus, e.g., according to the preset training corpus having the same application scenario as the speech, determining similarities between the words in the sentence text and the words in the preset training corpus, and determining whether the words in the sentence text are wrong words according to the similarities. Therefore, in the embodiment of the present disclosure, when recognizing the wrong words in the sentence text, the recognition is performed according to the preset training corpus having the same application scenario as the speech, thereby avoiding the existence of the words which do not conform to the speech application scenario in the sentence text corresponding to the speech, and increasing the accuracy of speech recognition.

In the above speech recognition method according to an embodiment of the present disclosure, each word in the preset training corpus corresponds to one word vector model, and the similarity between two words is determined according to the word vector model corresponding to each word. A brief description will be given below on how to determine the similarity between two words according to a word vector model.

In the embodiment of the present disclosure, the preset pinyin-to-word mapping table is a mapping relationship table of pinyin and words, which is established by converting each word into pinyin according to the words in the preset training corpus and in which the words with the same pinyin are divided into a group. For example, the pinyin of such words including "experiment', "test" and "Shiyan" is identical, then the words with the same pinyin are stored in one group. Specifically, each word in the preset training corpus is labeled with a corresponding pinyin representation mode, the pinyin corresponding to all the words are arranged in sequence to obtain the pinyin representation mode of a word, and the words with the same pinyin are arranged in sequence in a group to obtain a mapping relationship in which one pinyin corresponds to a plurality of words. When a word is looked up in a preset pinyin-to-word mapping table, the corresponding word can be indexed according to the pinyin corresponding to the word.

It should be noted that, the preset pinyin-to-word mapping table and the preset training corpus are in one-to-one correspondence, if the application scenarios of speech are different, the preset pinyin-to-word mapping tables are also different.

Optionally, according to the zone bit code representation mode of Chinese characters, the preset pinyin-to-word mapping table in the embodiment of the present disclosure can be stored in advance according to the mode of locating a zone bit code, thereby facilitating the rapid look up of pinyin and the words corresponding to pinyin from the preset pinyin-to-word mapping table.

In the embodiment of the present disclosure, the determining the corresponding substitute word of the wrong word includes: according to the preset training corpus having the same application scenario as the speech, and according to a preset pinyin-to-word mapping table corresponding to the preset training corpus, determining the word which conforms to the current speech application scenario and which has the greatest similarity with the correct word in the preset training corpus and in the sentence text, and taking the word with the greatest similarity as a substitute word. Therefore, in the embodiment of the present disclosure, through a preset training corpus having the same application scenario as the speech, and in the preset pinyin-to-word mapping table corresponding to the preset training corpus, the word which conforms to the current speech application scenario and which has the greatest similarity with the correct word in the preset training corpus and in the sentence text is looked up to serve as a substitute word, so as to improve the accuracy of speech recognition.

Figure 2:
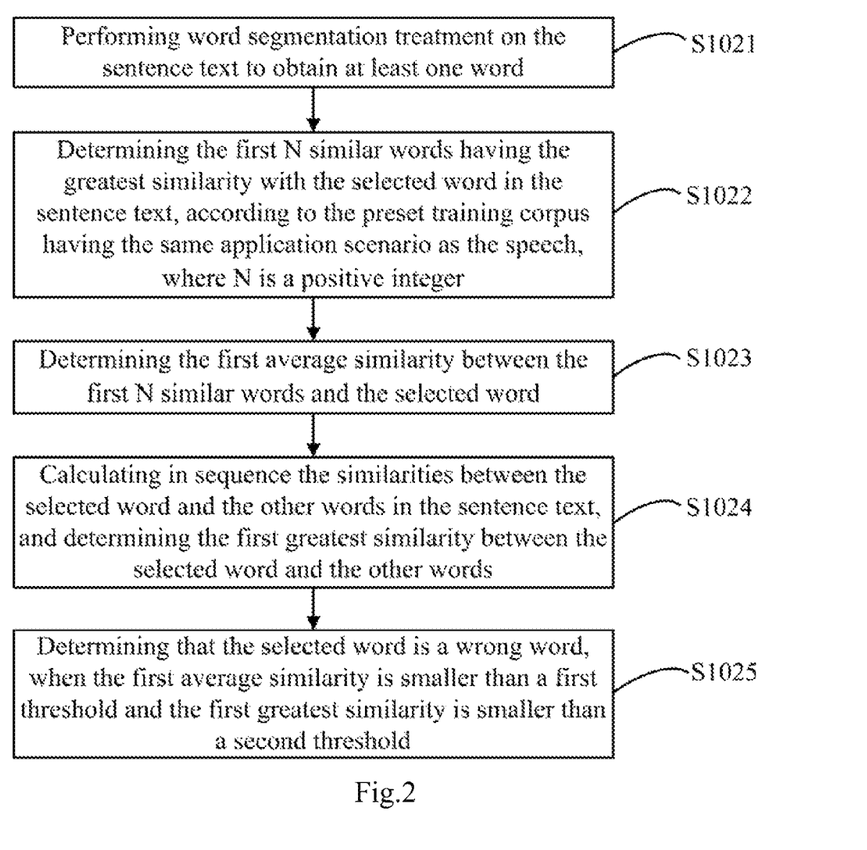
FIG. 2 is a flow diagram of a second speech recognition method according to an embodiment of the present disclosure.

In specific embodiments, in the above speech recognition method according to an embodiment of the present disclosure, as shown in FIG. 2, the recognizing the wrong words in a sentence text in step S102 includes the following steps.

S1021: performing word segmentation treatment on the sentence text to obtain at least one word.

Where word segmentation of a sentence text can be realized by using current ordinary word segmentation algorithms or tools, such as IKAnalyzer, Jieba word segmentation, ICTCLAS, etc., and such algorithms or tools can perform word segmentation accurately.

S1022: determining the first N similar words having the greatest similarity with the selected word in the sentence text, according to the preset training corpus having the same application scenario as the speech, where N is a positive integer.

S1023: determining the first average similarity between the first N similar words and the selected word.

S1024: calculating in sequence the similarities between the selected word and the other words in the sentence text, and determining the first greatest similarity between the selected word and the other words.

S1025: determining that the selected word is a wrong word, when the first average similarity is smaller than a first threshold and the first greatest similarity is smaller than a second threshold.

Specifically, the sentence text is subjected to word segmentation to obtain one word or a plurality of words, and when recognizing the words in the sentence text to determine whether the words are wrong words, a plurality of words are recognized in sequence. Where for each word, it is determined whether the selected word is a wrong word according to a preset training corpus. Firstly, the first N words having the greatest similarity with the currently selected word are found out from the preset training corpus, then the similarities between the first N words and the currently selected word are calculated to obtain the values of N similarities, and the average value of the values of N similarities is determined and is recorded as Da. Secondly, the similarities between the currently selected word and the other words in the sentence text are calculated, if the sentence text includes three words in total, then the similarities between the currently selected word and the other two words are calculated, then the value having the greatest similarity with the currently selected word and the word corresponding to the value are determined, and the value having the greatest similarity with the current word is taken as the first greatest similarity and is recorded as Db. Finally, when determining that Da is smaller than the first threshold and Db is smaller than the second threshold, then the currently selected word is determined to be a wrong word. Each word in a sentence text is recognized in sequence in this way, until all the words are recognized. Where the values of the first threshold and the second threshold can be set according to the actual application scenario and the requirements of users, and the values are not specifically limited herein. Where the first N words having the greatest similarity refer to the words that, when arranged from big to small in terms of similarities, have their similarities arranged in the first N positions, and the value of N can also be set according to the actual application scenarios and requirements of users.

It should be noted that, when determining the first average similarity of the first N similar words and the selected word, firstly, the values of the similarities between the first N similar words and the currently selected word are respectively calculated. Where the similarities with the selected word can be calculated in a plurality of ways, for example, the calculation can be performed according to a cosine distance, a Euclidean distance and a mahalanobis distance.

For example, when the similarity is determined according to a cosine distance, the similarity between two words is determined according to formula (1):

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}} \quad (1)$$

Where n represents that each word is an n-dimensional word vector model, $A_i$ is the i-dimensional data in the word vector model of a first word, and $B_i$ is the i-dimensional data in the word vector model of a second word.

The similarities between the first N similar words and the selected word can be calculated according to formula (1), where A can be any word in the first N words, and B is the selected word; or, A is the selected word while B is any word in the first N words. The dimensionality of the word vector model corresponding to each word is not specifically limited herein. Where after the similarity between two words is obtained according to the above formula (1), if the obtained value of the similarity is smaller than 0, then the value of the similarity is recorded as 0.

Therefore, in the embodiment of the present disclosure, when recognizing the wrong words in a sentence text, the words in a training corpus under specific language environment are recognized, and the similarities between the selected word and the words in the training corpus are determined, to recognize the wrong words which do not conform to the language environment, the algorithm is simple, the wrong words are easy to recognize, and the recognition is easy to realize.

In specific embodiments, after determining that the selected word is a wrong word according to the method as shown in FIG. 2, a substitute word corresponding to the wrong word is determined according to the preset pinyin-to-word mapping table. In the above speech recognition method according to an embodiment of the present disclosure, please refer to FIG. 3, the determining substitute words corresponding to the wrong words in step S103 includes the following steps.

Figure 3:
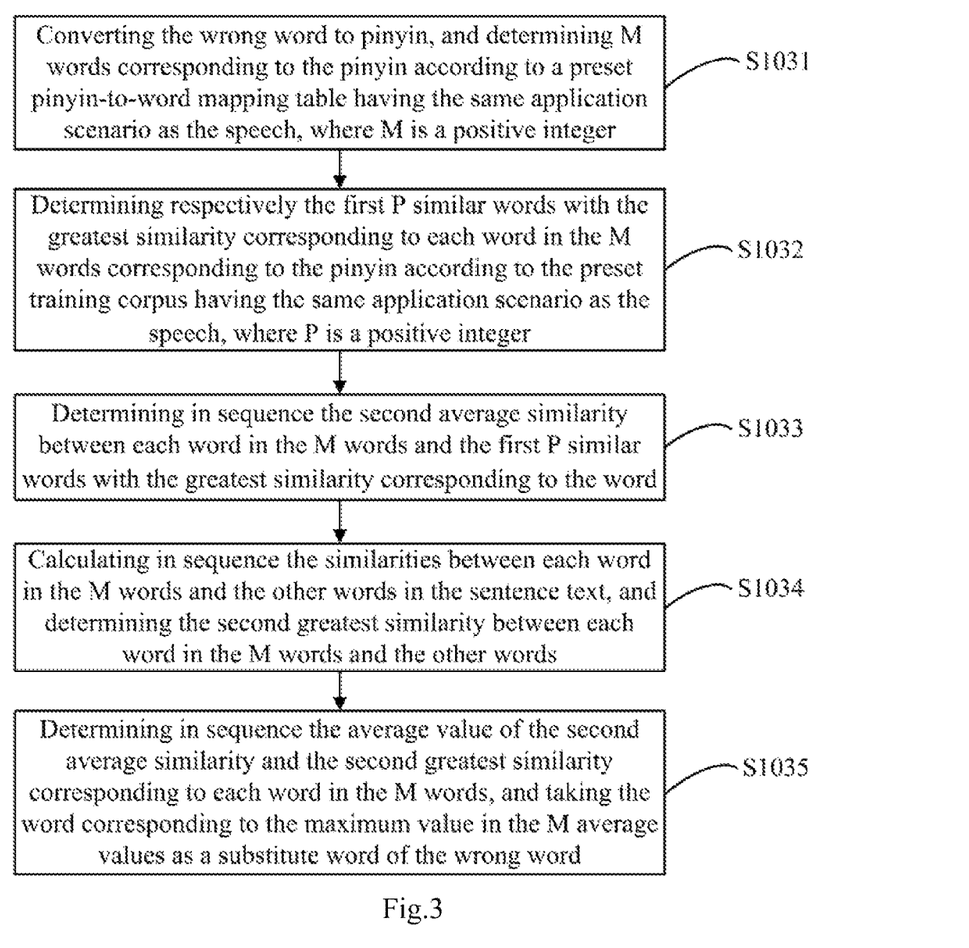
FIG. 3 is a flow diagram of a third speech recognition method according to an embodiment of the present disclosure.

S1031: converting the wrong word to pinyin, and determining M words corresponding to the pinyin according to a preset pinyin-to-word mapping table having the same application scenario as the speech, where M is a positive integer.

Where the preset pinyin-to-word mapping table includes a one-to-many mapping relationship between pinyin and words, the wrong word is converted into pinyin, the pinyin corresponding to the wrong word is looked up in the preset pinyin-to-word mapping table, and a plurality of words corresponding to the pinyin are determined in the preset pinyin-to-word mapping table. Therefore, the substitute words corresponding to one wrong word includes M words, how to determine the substitute word corresponding to the wrong word in the M words can be determined through the following steps.

It should be noted that, if no corresponding pinyin exists in the preset pinyin-to-word mapping table, then the mapping relationship of the pinyin is stored in the pinyin-to-word mapping table; if corresponding pinyin exists in the preset pinyin-to-word mapping table, but the words corresponding to the pinyin do not include the wrong word, then the wrong word is added to the group of words corresponding to the pinyin.

S1032: determining respectively the first P similar words with the greatest similarity corresponding to each word in the M words corresponding to the pinyin according to the preset training corpus having the same application scenario as the speech, where P is a positive integer.

Where in the preset training corpus, the first P similar words having the greatest similarity with a first word in the M words are looked up, and P is equal to or not equal to N; the first P similar words having the greatest similarity with a second word in the M words are looked up, until the first P similar words having the greatest similarity with the Mth word in the M words are determined.

S1033: determining in sequence the second average similarity between each word in the M words and the first P similar words with the greatest similarity corresponding to the word.

Where the similarities between the first word in the M words and the first P similar words having the greatest similarity with the first word are calculated in sequence according to a cosine distance, a Euclidean distance and a mahalanobis distance, where the similarities of the P similar words can be calculated according to formula (1), then the second average similarity of the P similarities is calculated and recorded as Dc. The second average similarity corresponding to the second word in the M words is calculated in sequence according to the above method. Where when the similarity is determined according to formula (1), if the value of similarity is smaller than 0, then the similarity is recorded as 0.

S1034: calculating in sequence the similarities between each word in the M words and the other words in the sentence text, and determining the second greatest similarity between each word in the M words and the other words.

Where the similarities between each word in the M words and the other words in the sentence text are calculated according to a cosine distance, a Euclidean distance and a mahalanobis distance. For example, the similarities between each word in the M words and the other words in the sentence text can be calculated using the above formula (1). Specifically, if the sentence text includes 3 words, then the other words include 2 words; the similarities between the first word in the M words and the other two words are calculated, and the second greatest similarity Dd corresponding to the first word is determined; the similarities between the second word in the M words and the other words are calculated, and the second greatest similarity Dd corresponding to the second word is determined; and the similarities between each word in the M words and the other words are calculated in sequence, and the second greatest similarity Dd corresponding to each word is calculated.

S1035: determining in sequence the average value of the second average similarity and the second greatest similarity corresponding to each word in the M words, and taking the word corresponding to the maximum value in the M average values as a substitute word of the wrong word.

Wherein in the M words corresponding to pinyin, the M average values are calculated according to step S1035, the greatest value in the M average values is determined, and the word corresponding to the greatest value is taken as a substitute word of the selected word.

Therefore, in the embodiments of the present disclosure, the substitute words of wrong words are looked up through a preset pinyin-to-word mapping table and a preset training corpus, the word having the greatest similarity with the current language environment is taken as a substitute word for substitution, thereby improving the accuracy of speech recognition result, and improving the accuracy of the substitute words.

In specific embodiments, in the above speech recognition method according to an embodiment of the present disclosure, the performing word segmentation treatment on the sentence text to obtain at least one word includes: performing word segmentation treatment on the sentence text and removing stop words to obtain at least one word. Specifically, when the sentence text is subjected to word segmentation treatment, the stop words which have no ambiguity are filtered out, thereby saving the time for speech recognition.

Figure 4:
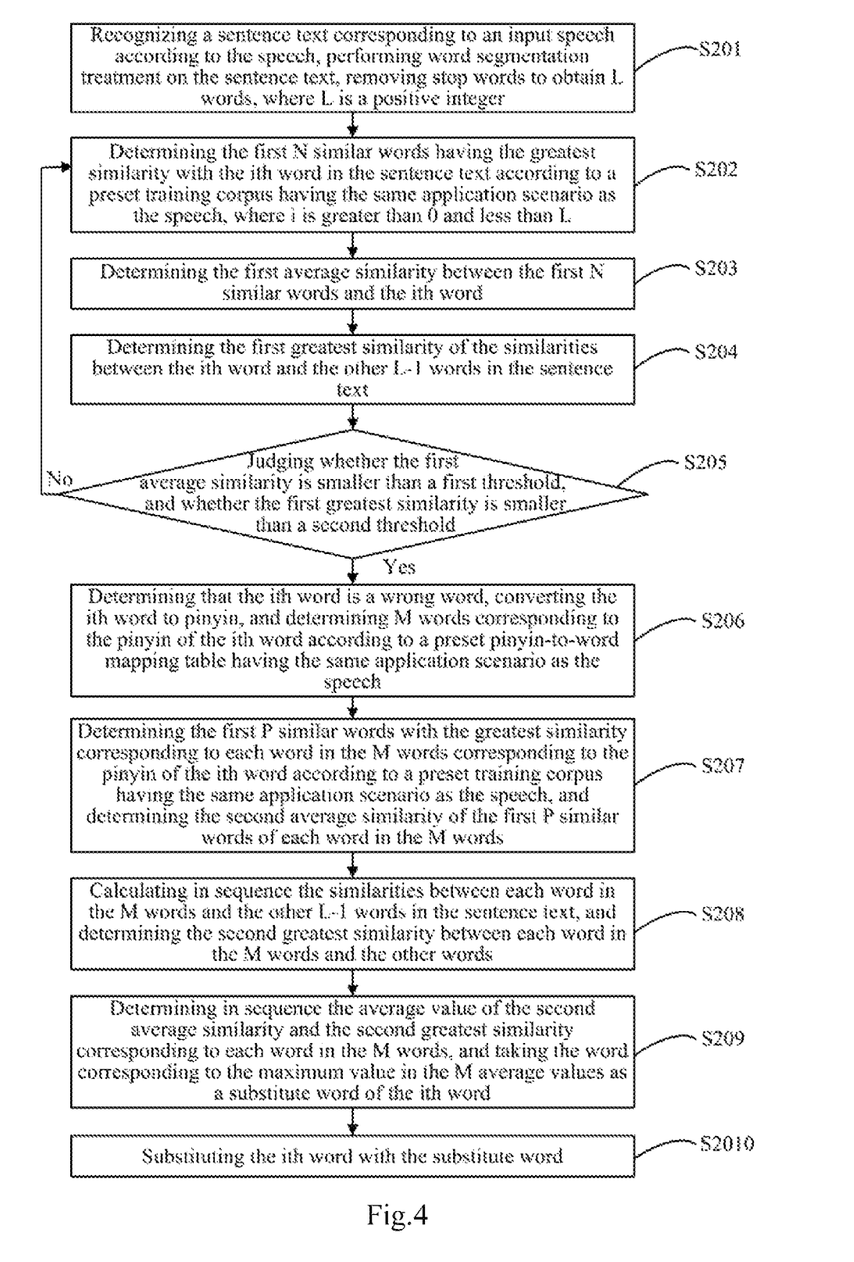
FIG. 4 is a flow diagram of a fourth speech recognition method according to an embodiment of the present disclosure.

The steps of the speech recognition method according to an embodiment of the present disclosure will be described in detail below through specific embodiments, please refer to FIG. 4, and the speech recognition method includes the following steps.

S201: recognizing a sentence text corresponding to an input speech according to the speech, performing word segmentation treatment on the sentence text, removing stop words to obtain L words, where L is a positive integer.

S202: determining the first N similar words having the greatest similarity with the ith word in the sentence text according to a preset training corpus having the same application scenario as the speech, where i is greater than 0 and less than L.

S203: determining the first average similarity between the first N similar words and the ith word.

S204: determining the first greatest similarity of the similarities between the ith word and the other L−1 words in the sentence text.

S205: judging whether the first average similarity is smaller than a first threshold, and whether the first greatest similarity is smaller than a second threshold, if so, then executing step S206, otherwise, executing step S202, and changing i to i+1.

S206: determining that the ith word is a wrong word, converting the ith word to pinyin, and determining M words corresponding to the pinyin of the ith word according to a preset pinyin-to-word mapping table having the same application scenario as the speech;

S207: determining the first P similar words with the greatest similarity corresponding to each word in the M words corresponding to the pinyin of the ith word according to a preset training corpus having the same application scenario as the speech, and determining the second average similarity of the first P similar words of each word in the M words.

S208: calculating in sequence the similarities between each word in the M words and the other L−1 words in the sentence text, and determining the second greatest similarity between each word in the M words and the other words.

S209: determining in sequence the average value of the second average similarity and the second greatest similarity corresponding to each word in the M words, and taking the word corresponding to the maximum value in the M average values as a substitute word of the ith word.

S2010: substituting the ith word with the substitute word.

The L words in a sentence text are recognized in sequence and the wrong words are substituted according to steps S202 to S2010.

In conclusion, in the speech recognition method in the embodiment of the present disclosure, wrong words are detected mainly by using simple word vector models in a training corpus, judging the similarities of similar words in the preset training corpus with the selected word, and judging the similarities between the selected word in the sentence text and the other words; and the word with the greatest possibility is found out through the feature properties of corresponding similar words in pronunciation in the preset pinyin-to-word mapping table, the method is simpler and easy to realize, and the efficiency is higher.

Figure 5:
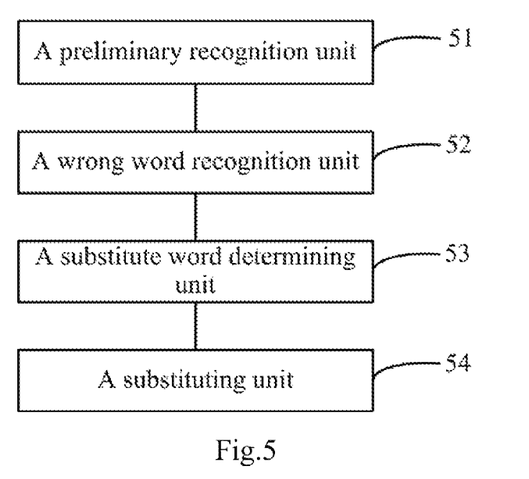
FIG. 5 is a schematic structural diagram of a speech recognition device according to an embodiment of the present disclosure.

Based on the same inventive idea, please refer to FIG. 5, the embodiment of the present disclosure further provides a speech recognition device, the device including the following units.

A preliminary recognition unit 51 is configured to recognize a sentence text corresponding to an input speech according to the speech.

A wrong word recognition unit 52 is configured to recognize wrong words in the sentence text.

A substitute word determining unit 53 is configured to determine substitute words corresponding to the wrong words.

A substituting unit 54 is configured to substitute the wrong words with the substitute words.

In specific embodiments, in the above speech recognition device according to an embodiment of the present disclosure, the wrong word recognition unit 52 is specifically configured to: perform word segmentation treatment on the sentence text to obtain at least one word; determine first N similar words having the greatest similarity with the selected word in the sentence text according to a preset training corpus having the same application scenario as the speech, where N is a positive integer; determine the first average similarity between the first N similar words and the selected word; calculate in sequence the similarities between the selected word and the other words in the sentence text, and determine the first greatest similarity between the selected word and the other words; and when the first average similarity is smaller than a first threshold, and the first greatest similarity is smaller than a second threshold, then determine that the selected word is a wrong word.

In specific embodiments, in the above speech recognition device according to an embodiment of the present disclosure, the substitute word determining unit 53 is specifically configured to: convert the wrong word to pinyin, and determine M words corresponding to the pinyin according to a preset pinyin-to-word mapping table having the same application scenario as the speech, where M is a positive integer; determine respectively first P similar words with the greatest similarity corresponding to each word in the M words corresponding to the pinyin according to the preset training corpus having the same application scenario as the speech, where P is a positive integer; determine in sequence the second average similarity between each word in the M words and the first P similar words with the greatest similarity corresponding to the word; calculate in sequence the similarities between each word in the M words and the other words in the sentence text, and determine the second greatest similarity between each word in the M words and the other words; and determine in sequence the average value of the second average similarity and the second greatest similarity corresponding to each word in the M words, and use the word corresponding to the maximum value in the M average values as a substitute word of the wrong word.

In specific embodiments, in the above speech recognition device according to an embodiment of the present disclosure, each word in a preset training corpus corresponds to one word vector model, and the similarity between two words is determined according to the word vector model corresponding to each word.

In specific embodiments, in the above speech recognition device according to an embodiment of the present disclosure, the preset pinyin-to-word mapping table is a mapping relationship table of pinyin and words which is established by converting words into pinyin according to the words in the preset corpus and in which the words with the same pinyin are divided into a group.

In specific embodiments, in the above speech recognition device according to an embodiment of the present disclosure, the preset pinyin-to-word mapping table is stored in advance according to the mode of locating a zone bit code.

In specific embodiments, in the above speech recognition device according to an embodiment of the present disclosure, the wrong word recognition unit 52 performs word segmentation treatment on the sentence text to obtain at least one word and is specifically configured to: perform word segmentation treatment on the sentence text and remove stop words to obtain at least one word.

Some embodiments of the present disclosure further provide a speech recognition device including: a processor; and a memory storing at least one instruction, where the processor is configured to execute the at least one instruction to perform the method as illustrated in FIGS. 1-4, and the content of the method can refer to FIGS. 1-4 and the related descriptions.

In conclusion, in the speech recognition method according to embodiments of the present disclosure, firstly a sentence text corresponding to an input speech is recognized according to the speech; then wrong words in the sentence text are recognized; substitute words corresponding to the wrong words are determined; and the wrong words are substituted with the substitute words. Therefore, in the speech recognition method according to an embodiments of the present disclosure, after the sentence text corresponding to an input speech is determined, the words in the sentence text are recognized to determine the wrong words not conforming to the application scenario in the sentence text, then the substitute words corresponding to the wrong words are further determined and the wrong words are substituted, therefore, the accuracy of speech recognition is improved.

Evidently, those skilled in the art can make various modifications and variations to the present utility model without departing from the spirit and scope of the present utility model. Accordingly the present utility model is also intended to encompass these modifications and variations thereto so long as the modifications and variations come into the scope of the claims appended to the present utility model and their equivalents.

The invention claimed is:

1. A speech recognition method, the method comprising:
   recognizing a sentence text corresponding to an input speech according to the speech;
   recognizing wrong words in the sentence text;
   determining substitute words corresponding to the wrong words; and
   substituting the wrong words with the substitute words;

wherein the recognizing wrong words in the sentence text comprises:
  performing word segmentation treatment on the sentence text to obtain at least one word;
  determining first N similar words having a greatest similarity with a selected word in the sentence text according to a preset training corpus, wherein N is a positive integer;
  determining a first average similarity between the first N similar words and the selected word;
  calculating in sequence similarities between the selected word and other words in the sentence text, and determining a first greatest similarity between the selected word and the other words; and
  determining that the selected word is a wrong word, when the first average similarity is smaller than a first threshold and the first greatest similarity is smaller than a second threshold.

2. The method according to claim 1, wherein the determining substitute words corresponding to the wrong words comprises:
  converting the wrong word to pinyin, and determining M words corresponding to the pinyin according to a preset pinyin-to-word mapping table, wherein M is a positive integer;
  determining respectively first P similar words with the greatest similarity corresponding to each word in the M words corresponding to the pinyin according to the preset training corpus, wherein P is a positive integer;
  determining in sequence a second average similarity between each word in the M words and the first P similar words with the greatest similarity corresponding to the word;
  calculating in sequence similarities between each word in the M words and other words in the sentence text, and determining a second greatest similarity between each word in the M words and the other words; and
  determining in sequence an average value of the second average similarity and the second greatest similarity corresponding to each word in the M words, and using a word corresponding to a maximum value in M average values as a substitute word of the wrong word.

3. The method according to claim 2, wherein
the preset pinyin-to-word mapping table is a mapping relationship table of pinyin and words, which is established by converting words into pinyin according to the words in the preset corpus, and in which the words with the same pinyin are divided into a group.

4. The method according to claim 3, wherein the preset pinyin-to-word mapping table is stored in advance according to a mode of locating a zone bit code.

5. The method according to claim 2, wherein
each word in the preset training corpus corresponds to a word vector model, and a similarity between two words is determined according to the word vector model corresponding to each word.

6. The method according to claim 2, wherein the preset pinyin-to-word mapping table is stored in advance according to a mode of locating a zone bit code.

7. The method according to claim 1, wherein
each word in the preset training corpus corresponds to a word vector model, and a similarity between two words is determined according to the word vector model corresponding to each word.

8. The method according to claim 1, wherein the performing word segmentation treatment on the sentence text to obtain at least one word comprises:
  performing word segmentation treatment on the sentence text and removing stop words to obtain at least one word.

9. A speech recognition device, comprising:
  a processor; and
  a memory storing at least one instruction, wherein the processor is configured to execute the at least one instruction to:
  recognize a sentence text corresponding to an input speech according to the speech;
  recognize the wrong words in the sentence text;
  determine substitute words corresponding to the wrong words; and
  substitute the wrong words with the substitute words;
  wherein the processor is configured to execute the at least one instruction to:
    perform word segmentation treatment on the sentence text to obtain at least one word;
    determine first N similar words having the greatest similarity with a selected word in the sentence text according to a preset training corpus, wherein N is a positive integer;
    determine a first average similarity between the first N similar words and the selected word;
    calculate in sequence similarities between the selected word and other words in the sentence text, and determine a first greatest similarity between the selected word and the other words; and
    determine that the selected word is a wrong word, when the first average similarity is smaller than a first threshold and the first greatest similarity is smaller than a second threshold.

10. The device according to claim 9, wherein the processor is configured to execute the at least one instruction to:
  convert the wrong word to pinyin, and determine M words corresponding to the pinyin according to a preset pinyin-to-word mapping table, wherein M is a positive integer;
  determine respectively first P similar words with the greatest similarity corresponding to each word in the M words corresponding to the pinyin according to the preset training corpus, wherein P is a positive integer;
  determine in sequence a second average similarity between each word in the M words and the first P similar words with the greatest similarity corresponding to the word;
  calculate in sequence similarities between each word in the M words and other words in the sentence text, and determine a second greatest similarity between each word in the M words and the other words; and
  determine in sequence an average value of the second average similarity and the second greatest similarity corresponding to each word in the M words, and use a word corresponding to a maximum value in M average values as a substitute word of the wrong word.

11. The device according to claim 10, wherein
the preset pinyin-to-word mapping table is a mapping relationship table of pinyin and words, which is established by converting words into pinyin according to the words in the preset corpus, and in which the words with the same pinyin are divided into a group.

12. The device according to claim 11, wherein the preset pinyin-to-word mapping table is stored in advance according to a mode of locating a zone bit code.

13. The device according to claim 10, wherein
each word in the preset training corpus corresponds to a word vector model, and a similarity between two words is determined according to the word vector model corresponding to each word.

14. The device according to claim 10, wherein the preset pinyin-to-word mapping table is stored in advance according to a mode of locating a zone bit code.

15. The device according to claim 9, wherein
each word in the preset training corpus corresponds to a word vector model, and a similarity between two words is determined according to the word vector model corresponding to each word.

16. The device according to claim 9, wherein the processor is configured to execute the at least one instruction to:
perform word segmentation treatment on the sentence text and remove stop words to obtain at least one word.

* * * * *